United States Patent [19]

Havens et al.

[11] 3,767,210

[45] Oct. 23, 1973

[54] MAGNETIC TAPE CLEANER APPARATUS

[75] Inventors: Charlie C. Havens, Garland; Herbert E. Welch, Richardson, both of Tex.

[73] Assignee: Collins Radio Company, Dallas, Tex.

[22] Filed: Apr. 24, 1972

[21] Appl. No.: 247,151

[52] U.S. Cl. .................. 274/47, 274/4 R, 15/210 R

[51] Int. Cl. .............................................. G11b 3/58

[58] Field of Search .................. 274/47; 15/93, 100, 15/210 R; 179/100.22

[56] References Cited

UNITED STATES PATENTS

| | | | |
|---|---|---|---|
| 3,035,295 | 5/1962 | Buslik et al. | 15/100 |
| 3,439,922 | 4/1969 | Howard | 15/210 |
| 3,262,144 | 7/1966 | Avila | 15/142 |
| 1,294,180 | 2/1919 | Schneider | 15/209 AH |
| 3,266,196 | 8/1966 | Barcaro | 274/47 |
| 3,239,868 | 3/1966 | De Vito | 15/100 |

*Primary Examiner*—Harry N. Haroian
*Attorney*—Bruce C. Lutz et al.

[57] ABSTRACT

A fine mesh screening means used in a rubbing or sliding relationship to the magnetic oxide side of a magnetic tape to remove dust or other contamination particles from the magnetic tape for the purpose of reducing errors in electrical reading of the magnetic tape.

1 Claim, 4 Drawing Figures

MAGNETIC TAPE CLEANER APPARATUS

The present invention is generally related to cleaning devices and more specifically to a device for cleaning particles off a magnetic tape.

When high densities of material are played on magnetic tape such as for data storage and retrieval, small particles of dust or tape wear particles can cause errors in the retrieval process. At times, under present technology, as many as 2,400 data bits per inch are stored on magnetic tape. This means that each data bit is contained with a space having a total distance of 0.0004 inches. On the other hand, contamination particles are often as large as several mils or in the neighborhood of 0.001 to 0.010 inches in breadth. With contamination particles such as this, the presence of the contamination between the tape and the head reduces the signal transmission amplitude of readin or readout to such an extent that accuracy in information retrieval is seriously impaired if not completely negated. This, of course, produces errors in the retrieval over a distance on the tape covering several bits of information.

The present invention comprises the use of a fine screen which lightly rubs on the surface of the magnetic oxide portion of the tape to sweep away or trap dust particles or other foreign material. In some instances the contamination particles are pushed along until they fall off or in the alternative are finally embedded into the screen. The continued use of a sealed cartridge containing the screen eventually reduces the number of errors to such a low level as to be a negligible amount over a considerable period of time. When the invention is used in an open magnetic cartridge or cassette, there is still a very large improvement in excess of one order of magnitude in reducing the number of errors obtained in playing back data from a tape. It is therefore an object of the present invention to reduce the errors normally caused by particle matter on a tape in in playback conditions.

Other objects and advantages of the present invention will be apparent from a reading of the specification and appended claims in conjunction with the drawings wherein:

Figure 1:
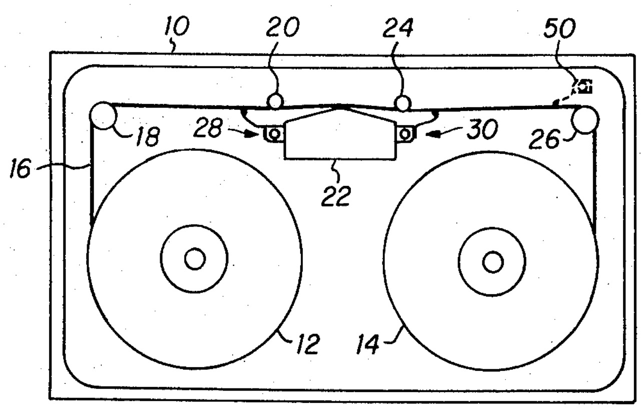
FIG. 1 is a general illustration of a portion of a tape cartridge.

Referring to FIG. 1, it will be noted that there is a cassette base 10 having reels 12 and 14. A tape generally shown as 16 extends from reel 10 around a roller 18, is displaced slightly by a guide 20 before passing by a head or magnetic transducer means 22 and then is again displaced slightly by a guide 24 before arriving at a further roller 26 and being accepted by reel 14. On the left-hand side of head 22 is a first tape cleaner generally indicated as 28 and on the right-hand side is a second tape cleaner generally indicated as 30. Each of these tape cleaners has a cantilevered arm which is forced in a spring action against the magnetic oxide portion of the tape 16.

Figure 2:
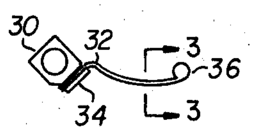
FIG. 2 is a side view of one embodiment of a tape cleaner used in practicing the present invention.

More detail of the cleaner is shown in FIG. 2 where a mounting bracket 30 is illustrated with a piece of screen 32 held in place between base 30 and a holding plate means 34. Holding plate 34 is attached to 30 through the use of screws or other attachment means. The cleaning means 32 contains an end portion 36 which is rolled in a small radius curve so that it will have an optimum amount of surface contact. Too little surface contact or too much surface contact tends to reduce the effectiveness of the cleaner. If the surface contact is too small, the edge is quite sharp and sometimes tends to scrape particles off the magnetic oxide portion of the tape. In addition, the cleaner will have less capacity to hold displaced particles if the surface contact is small. If the surface contact is too large, the surface tension obtained by the spring action of the cleaning means is inadequate to push dirt or other particles along the tape if they do not immediately embed themselves in the cleaning means. The cleaning means 32 in one embodiment comprised a screen having 230 openings per inch with the wires of the screen being comprised of stainless steel having a diameter of 1.4 mils. This left an opening between each wire of 2.9 mils square. It is obvious that coaser or finer screens and larger or smaller wires would still operate in the desired manner. The cleaning means 32 as shown is bent in an upwardly direction so that when mounted there is spring action in the cleaning means and especially in the end 36 to hold it against the tape 16. This force is relatively constant because the rollers 18–26 prevent more than very minimal movement of the cleaning means. However, the cleaning devices have been utilized in tape cartridges where there was considerable movement in a vertical direction of the tape and thereby causing movement of the cleaning portion 36 of the cleaning means 32 with relation to the mounting bracket 30. The device has still worked satisfactorily in such a condition.

Figure 3:
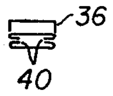
FIG. 3 is a cross section through a portion of FIG. 2 as illustrated by cite lines 3—3.

As shown in FIG. 3, the sides of the screen 32 are rolled or folded under so that there are no sharp edges to tear the surface of the magnetic tape 16. The folded under portions of the screen are indicated as 40. There are 4 such edges since in the embodiment of FIG. 2 the screen is brought out from the holding device 34 and formed in the circular portion 36 and then brought back to the holding means 34 in the base 30. The top of the cleaning portion 36 is also shown in FIG. 3.

Figure 4:
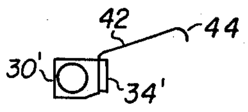
FIG. 4 is a side view of another embodiment of the present invention.

Proceeding to FIG. 4, another embodiment of the invention is shown with a base 30' and a clamp or holding plate means 34' as illustrated in FIG. 2. However, the shape of the cleaning screen is differently configured. The screen is labeled as 42 and contains a rounded portion 44. The radius of the rounded portion 44 is generally the same as that of 36 in FIG. 2. Further, the screen 42 while still folded under as shown in FIG. 3 is only of a single thickness. This embodiment has also been used satisfactorily in instances where space limitations prevented the version shown in FIG. 2 from being used.

The cassette shown in FIG. 1 may be of the type shown in U.S. Pat. application Ser. No. 91,337 filed Nov. 20, 1970 in the name of Malcolm B. Northrup and assigned to the same assignee as the present invention. While the referenced Northup patent is a sealed tape cassette, the present invention will operate to provide an improved information retrieval process in an open type cassette. The tape cleaning material such as 32 and 42 is generally of the type used in silk-screening process. While a specific screen used in two embodiments has been discussed, the screen may contain larger or smaller wires and have larger or smaller openings depending upon the application of the tape cleaner. One source of such screening material is Newark Wire and Cloth Company of Newark, N. J. Other sources are also available.

While in general the cleaning means is used on the magnetic oxide portion of the magnetic tape immediately prior to the head or reading portion of the tape cassette, even more cleaning action may be obtained by using additional cleaning means such as shown in dash lines in FIG. 1 and referenced by indicator 50 on the nonmagnetic side. Since there is always the possibility of transfer of foreign matter from the nonmagnetic side of a tape to the magnetic side of the tape due to physical contact in the reel, such a further cleaner as 50 may be desirable in some applications.

Although two main cleaners have been shown in FIG. 1, completely satisfactory results have been obtained in some applications with only a single cleaner on one side of the head of the tape unit.

As will be realized, no electrical connections are illustrated since the inventive concept is in the screening means cleaner for magnetic tapes and the remaining information as to operation and construction of a cassette is available to the public at large through prior art and in particular may be obtained in the above referenced Northrup invention.

Although a single embodiment of the present invention has been disclosed and described, it will be obvious to those skilled in the art that other embodiments and other materials may be designed to produce the same function. Therefore, we wish to be limited only to the concept using a screen type material for cleaning a magnetic tape by a rubbing action thereagainst as defined in the appended claims.

We claim:

1. A tape cleaning means comprising, in combination:

resilient screening material configured with folded edges with the ends of said folded edges being positioned adjacent one side of said screening material, one end of said folded screening material having a small radius of curvature configuration; and support means attached to the other end of said screening material whereby the end of said screening material having said small radius of curvature is resiliently biased and positioned away from said support means.

* * * * *